United States Patent Office 3,267,169
Patented August 16, 1966

3,267,169
OCTATRIENE PRODUCTION
Edgar J. Smutny, San Francisco, Calif., assignor to Shell Oil Company, New York, N.Y., a corporation of Delaware
No Drawing. Filed May 14, 1965, Ser. No. 455,953
20 Claims. (Cl. 260—682)

This invention relates to an improved method for the production of 1,3,7-octatrienes.

Methods are available in the art for the dimerization of conjugated dienes under conditions whereby a diene dimer or a derivative thereof is obtained. In general, such methods are characterized by the formation of a dimer or dimer moiety that results from dimerization in a non-linear manner, for example, from dimerization of butadiene is typically obtained methylheptadiene as the principal acyclic product type. General methods for the production of diene dimers wherein the diene moieties have dimerized in a linear manner have not been available.

It is an object of the present invention to provide an improved method for the production of a linear diene dimer. More particularly it is an object of the present invention to provide an improved process for the production of certain $C_8$–$C_{10}$ 1,3,7-octatrienes. A further object is to provide a process for the production of 1,3,7-octatrienes by the degradation of aromatic 2,7-octadienyl ethers. A specific object is to provide a method for the production of 1,3,7-octatriene.

It has now been found that these objects are accomplished by contacting an aromatic 2,7-octadienyl ether having 0 to 2 methyl substituents on the octadienyl moiety with certain metal catalysts, a phenoxide anion catalyst promoter and a tertiary phosphine, and removing from the resulting mixture at least one degradation product component thereof. Without wishing to be bound by any specific theory, it appears probable that under the conditions of the process, one or more equilibria are established whereby the aromatic octadienyl ether reactant is placed in equilibrium with the degradation products thereof, including the phenol corresponding to the aromatic moiety of the ether reactant and a 1,3,7-octatriene. Removal of at least one of the degradation products under conditions whereby product recombination is prevented results in the efficient production of the desired 1,3,7-octatriene.

The aromatic 2,7-octadienyl ethers employed as reactant in the process of the invention incorporate within the molecular structure thereof at least one non- to dimethyl-2,7-octadienyl moiety, that is, at least one 2,7-octadienyl moiety having from 0 to 2 methyl groups substituted on the non-terminal carbon atoms thereof, which non- to di-methyl-2,7-octadienyl moieties are bound through the ether oxygen atom(s) to an aromatic ring. In alternative terminology, the non- to di-methyl-2,7-octadienyl moiety is identified as a $C_8$–$C_{10}$-2,7-octadienyl moiety. The aromatic $C_8$–$C_{10}$-2,7-octadienyl ether therefore has as a substituent on at least one aromatic ring therein at least one 1-(2,7-octadienyloxy) moiety having from 0 to 2 methyl substituents located on the 2,7-octadienyl portion thereof. The structure of the aromatic moiety of the aromatic octadienyl ether reactants is not critical and satisfactory results are obtained when the aromatic moiety has up to 24 carbon atoms and from 1 to 3 aromatic rings with up to 3 of the $C_8$–$C_{10}$ octadienyloxy moieties as above defined as substituents on each ring. When the aromatic moiety is polynuclear, that is, contains more than one aromatic ring, the rings are fused, are connected by carbon-carbon bonds directly between ring carbon atoms or are connected by alkylene bridge(s), preferably alkylene of up to 12 carbon atoms. In the case of such polynuclear aromatic moieties, it is not required that each aromatic ring be substituted with an octadienyloxy moiety as above defined, but it is evident that at least one aromatic ring must have as a substituent at least one $C_8$–$C_{10}$ 1-(2,7-octadienyloxy) moiety. It is therefore considered that the process of the invention is applicable to aromatic $C_8$–$C_{10}$ 2,7-octadienyl ethers of rather complex or alternatively of relatively simple structure.

Largely for reasons of economy and convenience, the preferred aromatic $C_8$–$C_{10}$ 2,7-octadienyl ethers are those wherein the aromatic moiety is of comparatively simple structure and the octadienyl moiety has a total of from 0 to 2 methyl substituents which are located on the carbon atom of the octadienyl moiety numbered 3 and one of the carbon atoms of the octadienyl moiety numbered 6 and 7, such as the aromatic octadienyl ethers represented by the formula

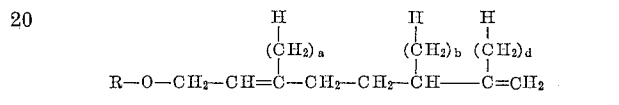

wherein $a$, $b$ and $d$ independently are whole numbers from 0 to 1 inclusive, the sum of $b$ and $d$, i.e., the term $(b+d)$, is a whole number from 0 to 1 inclusive, and R is a mononuclear, monovalent aromatic moiety of up to 14 carbon atoms which has the aromatic carbon-carbon unsaturation of the single carbocyclic aromatic ring as the only carbon-carbon unsaturation present within the moiety, i.e., the R group is free from non-aromatic unsaturation. The R group is a hydrocarbon moiety of only atoms of carbon and hydrogen, or is substituted-hydrocarbon having atoms of oxygen, nitrogen and halogen, particularly halogen of atomic number from 17 to 35 inclusive, i.e., the middle halogens chlorine and bromine, which atoms are incorporated in non-hydrocarbon aromatic ring substituents which are free of reactive hydrogen atoms, e.g., amino hydrogens or hydroxyl hydrogens, and are considered to be electron-donating substituents. By the term "electron-donating substituent" is meant a functional group which is considered to be orthopara directing when attached to an aromatic ring. Illustrative of such non-hydrocarbon aromatic ring substituents are alkoxy or dialkylamino wherein the alkyl moiety (moieties) is (are) lower alkyl of up to 4 carbon atoms, halo, and haloalkyl of up to 4 carbon atoms and up to 3 halogen atoms. Preferred R groups comprise hydrocarbon R moieties as above defined and halohydrocarbon R moieties which in addition to atoms of carbon and hydrogen have up to 3 atoms of halogen, particularly halogen of atomic number from 17 to 35 inclusive.

These preferred R groups are generically designated (halo) hydrocarbon moieties and are illustrated by phenyl, tolyl, xylyl, m-ethylphenyl, p-tert-butylphenyl, 2,4-dipropylphenyl, 2,4-di-tert - butylphenyl, m-bromophenyl, 3,5-dichlorophenyl and 2,4-dibromophenyl. Particularly preferred as the aromatic R moiety are monovalent, mononuclear hydrocarbon groups of up to 14 carbon atoms which are free from aliphatic unsaturation and especially preferred is phenyl.

The $C_8$–$C_{10}$-2,7-octadienyl moieties as defined above include 2,7-octadienyl, 3,6-dimethyl-2,7-octadienyl and 3,7-dimethyl-2,7-octadienyl. Of these, the 2,7-octadienyl moiety is preferred as the $C_8$–$C_{10}$ octadienyl portion of the ether reactant.

Expressed in terms of the preferred (halo)hydrocarbon aromatic moieties, the aromatic 2,7-octadienyl ether reactants of the process of the invention are ethers wherein one ether moiety is terminally-monovalent $C_8$–$C_{10}$ 2,7-octadienyl, i.e., $C_8$–$C_{10}$ 1-(2,7-octadienyl), and the other ether moiety is monovalent, mononuclear, (halo)hydrocarbon aromatic of up to 14 carbon atoms and up to 3 halogen atoms having only aromatic carbon-carbon unsaturation. Such ethers are exemplified by 1-phenoxy-2,7-octadiene, 1-(p-chlorophenoxy)-2,7-octadiene, 1-(m-propylphenoxy) - 2,7-octadiene, 1-phenoxy-3,6-dimethyl-2,7-octadiene, 1-(m-ethylphenoxy)-3,7-dimethyl-2,7-octadiene, 1 - phenoxy - 3,7 - dimethyl-2,7-octadiene, 1-(p-tert-butylphenoxy) - 2,7 - octadiene, 1-(3,5-dichlorophenoxy)-2,7-octadiene, 1-(p-bromophenoxy)-3,6-dimethyl-2,7-octadiene, 1-(2,4-dimethylphenoxy)-2,7-octadiene and the like.

In the process of the invention, the aromatic octadienyl ether is contacted with a metal compound catalyst, a phenoxide anion catalyst promoter and a tertiary phosphine. The catalyst employed in the process of the invention is a metal compound wherein the metal is selected from palladium, platinum and ruthenium. Particularly preferred as catalyst is a compound of a VIII C metal having an atomic number from 46 to 78 inclusive, i.e., palladium and platinum. Most preferred as catalyst is a compound of palladium. Without wishing to be bound by any particular theory, it appears that the chemical transformations during the course of the reaction which involve the metal compound are quite complex probably involving the formation and destruction of complexes between the metal moiety and the ether reactant and/or the octatriene product. Metal compounds that are soluble in the reaction medium as well as compounds that are superficially insoluble in the reaction system are operable, in the latter case apparently through dissolved metal compound moieties, the formation of which is probably influenced by interaction with other components of the reaction mixture and the solubilization resulting therefrom. To obtain optimum reaction rates, the metal compound is preferably soluble in the reaction mixture or serves as precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum or ruthenium salts of organic or inorganic acids which are strong or weak acids are suitable. When the metal-containing catalyst is provided as a salt, best results are obtained through utilization of a metal halide, e.g., platinum chloride, platinum bromide, palladium chloride, palladium iodide, ruthenium chloride, ruthenium bromide and the like, and particularly suitable results are obtained when metal chlorides are employed. Also suitable are salts wherein the metal is present in the anion, as for example in the case of palladium, the use of a chloropallidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of a palladium salt and organic ligand, such as is represented by the formula $$L_2PDX_2$$

wherein X is halogen, preferably chlorine, and L is a tertiary nitrogen-containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine, and dimethylhexylamine.

A particularly suitable type of palladium complex is a π-allyl complex of palladium. The simplest member of this class is a π-allyl palladium salt which, when the anion is chlorine, is represented by the following formula

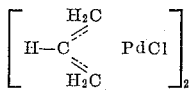

The preparation of this complex and related complexes is described by Huttel et al., Angew. Chemie, 71, 456 (1959). Other illustrative π-allyl complexes are represented by the formula

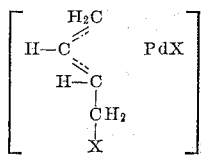

wherein X is halogen, which type of complexes are conveniently prepared by reaction of diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalysts in the process of the invention, although as previously stated, palladium-containing catalysts are generally to be preferred.

It is considered that in each above case the palladium or platinum is added as a palladium (II) or platinum (II) compound and the ruthenium is added as ruthenium (III) compounds, which compounds serve as catalyst or catalyst precursor in the process of the invention. Largely for reasons of convenience and economy, the preferred metal-containing catalyst is a palladium chloride, particularly π-allyl palladium chloride.

The process of the invention is characterized by the requirement for only catalytic quantities of platinum, palladium or ruthenium compound. Although utilization of larger amounts of metal-containing catalyst are not detrimental to the proces of the invention, amounts larger than about 1% mole based on the ether reactant or not generally required. Amounts of metal compound less than about 0.001% mole on the same basis are generally unsuitable because of the inevitable physical losses of catalyst during reaction and processing. In general, amounts of catalyst from about 0.01% mole to about 0.5% mole based on the ether reactant are satisfactory and are preferred.

Although in certain applications the metal compound alone serves as an effective catalyst, the activity of the metal compound is greatly enhanced by the presence within the reaction mixture of a phenoxide anion catalyst promoter. By the term "phenoxide anion" as employed herein is meant the anion corresponding structurally to that moiety illustratively produced by the removal of the hydrogen of at least one hydroxyl group of a phenol, i.e., a compound having at least one hydroxyl group as a substituent upon an aromatic ring. The structure of the phenoxide anion is not critical, and phenoxide anions analogous to phenols having up to 20 carbon atoms and from 1 to 4 phenolic hydroxyl groups are suitable. In an illustrative case wherein the phenoxide anion is analogous to a polyhydric phenol, an anion corresponding structurally to a moiety produced by removal of the hydrogen of one or all hydroxyl groups present is satisfactory. Thus, the phenoxide anion catalyst promoter is suitably a mono-anion, a di-anion, or an anion of higher valence. As satisfactory results are obtained by the use thereof, it is generally preferred to employ a phenoxide anion of comparatively simple structure. Preferred phenoxide anion catalyst promoters are mononuclear mono-anions which are free from aliphatic unsaturation and are hydrocarbon phenoxide anions of only atoms of carbon and hydrogen besides the phenoxide oxygen atom or are halohydrocarbon phenoxide anions additionally containing up to 3 atoms af halogen, particularly halogen of atomic number from 17 to 35 inclusive. Such phenoxide anions are generically termed (halo)hydrocarbon phenoxide anions and mononuclear, monovalent, (halo)hydrocarbon phenoxide anions of up to 14 carbon atoms and up to 3 halogen atoms which have only aromatic unsaturation are particularly suitable for utilization as the catalyst promoter. Such anions are illustrated by phenate anion, p-tert-butylphenoxide anion, m-octylphenoxide anion, p-chlorophenoxide anion, 2,4-dimethylphenoxide anion and the like. The phenate anion, i.e., the anion analogous to phenol, is especially useful as catalyst promoter.

The presence of the phenoxide anion in the reaction system may be brought about by any convenient method. In the preferred modification of the process of the invention, the phenoxide anion is added as a preformed material, customarily in the form of a soluble metal salt of the phenol. Suitable metal salts include alkali metal phenoxides, particularly sodium phenoxides, which are conveniently prepared by neutralization of a phenol with alkali metal base, for example, an alkali metal hydroxide such as sodium hydroxide, or by direct reaction of the phenol with alkali metal.

The role of the phenoxide anion in the process of the invention is not completely understood. Without wishing to be bound by any particular theory, it appears probable that the phenoxide anion serves as a metal-bound ligand in metal complexes which are possible intermediates in the degradation of the aromatic $C_8$–$C_{10}$ octadienyl ether reactant. The phenoxide anion is desirably present in molar amounts that are equal to or greater than the molar amount of the metal-containing compound catalyst. Molar ratios of phenoxide anion to metal compound from about 1:1 to about 8:1 are satisfactory, although molar ratios from about 1:1 to about 4:1 are preferred.

The process of the invention is conducted in the presence of a tertiary phosphine. Although some degree of degradation is occasionally obtained in the absence of the phosphine, the presence of the tertiary phosphine appears to add stability to the metal compound complexes thought to be intermediates in the degradation process, and in order to obtain optimum results, the presence of tertiary phosphine is required. The tertiary phosphine is suitably wholly aliphatic or contains one or more aromatic moieties, but is preferably free from aliphatic unsaturation. The tertiary phosphine is a hydrocarbon phosphine, that is, contains only atoms of carbon, hydrogen and phosphorus, or is a substituted-hydrocarbon phosphine having atoms of oxygen, nitrogen and halogen, particularly middle halogen, which atoms are incorporated in nonhydrocarbyl phosphorus substituents which are free of reactive hydrogen atoms, for example, ether, keto, tertiary amino and like substituents.

One useful class of tertiary phosphines comprises aliphatic phosphines wherein each phosphorus substituent has up to 14 carbon atoms. Although a variety of tertiary phosphines is suitably utilized, the preferred aliphatic tertiary phosphines are those mono-phosphines wherein each phsophorus substituent is hydrocarbon or halohydrocarbon of up to 3 halogen atoms, which phosphines are generically termed (halo)hydrocarbon tertiary phosphines. Particularly preferred aliphatic phosphines are trialkylphosphines wherein each alkyl independently is alkyl of up to 14 carbon atoms as illustrated by triethylphosphine, tributylphosphine, trilaurylphosphine, lauryldimethylphosphine, hexyldipropylphosphine, ethylbutyloctylphosphine and trioctylphosphine. Also suitable are tertiary phosphines having both aliphatic and aromatic phosphorus substituents as illustrated in the case of hydrocarbon tertiary phosphines by diphenylbutylphosphine, methyl - bis(p - tolyl)phosphine, dihexylphenylphosphine and diethyl(m-tolyl)phosphine.

The preferred class of tertiary phosphines, however, comprises tertiary aromatic phosphines having from 18 to 52 carbon atoms which have a single trivalent phosphorus atom, each valence of which is satisfied by bonding directly to the aromatic ring of an aromatic substituent. Although the aromatic substituents are suitably of varying structure, the preferred tertiary aromatic phosphines are represented by the formula

RRRP wherein R independently has the previously stated significance. In terms of the preferred aromatic phosphorus substituents, the tertiary phosphine comprises a trivalent phosphorous atom each valence of which is satisfied by bonding directly to the aromatic ring of a (halo)hydrocarbon, mononuclear, monovalent aromatic moiety of up to 14 carbon atoms and up to 3 halogen atoms, preferably halogen of atomic number from 17 to 35, which moiety is free from carbon-carbon unsaturation other than that of the aromatic ring contained therein, that is, each aromatic phosphorus substituent is free from alpihatic unsaturation.

Illustrative of suitable tertiary aromatic phosphines of the preferred class are triphenylphosphine, tris(p-tolyl)phosphine, tris(m-ethylphenyl)phosphine, tris(p-chlorophenyl)phosphine, bis(2,4 - dibromophenyl)phenylphosphine, (p-tert-butylphenyl)diphenylphosphine and tris(2,4-dimethylphenyl)phosphine. Also suitable, however, are certain essentially-aromatic diphosphines. Such diphosphines are represented by the formula

RRP—R'—PRR wherein R independently has the previously stated significance and R' is a saturated hydrocarbon aliphatic moiety, preferably α,ω-alkylene, having from 2 to 3 carbon atoms. The diphosphines of the above formula are characterized as tertiary diphosphines wherein each phosphorus atom has two aromatic substituents which are mononuclear, monovalent, (halo)hydrocarbon moieties of up to 14 carbon atoms and up to 3 atoms of halogen, preferably halogen of atomic number from 17 to 35, which have only aromatic unsaturation and the phosphorus-connecting moiety is divalent saturated hydrocarbon aliphatic moiety of from 2 to 3 carbon atoms. Exemplary diphosphines of this class are 1,2-bis(diphenylphosphino)ethane, 1,3 - bis(diphenylphosphino)propane, 1,2-bis[bis(p-chlorophenyl)phosphino]ethane, 1-(diphenylphosphino)-3-(phenyltolylphosphino)propane and the like. In general, however, best results are obtained when a tertiary aromatic mono-phosphine is employed and the use thereof is preferred, especially triphenylphosphine.

The amount of phosphine employed relative to the amount of metal compound catalyst present appears to be somewhat critical, as utilization of too little or too great an amount of phosphine relative to metal compound catalyst affords inferior results. Molar ratios of tertiary phosphine to metal compound from about 1:1 to about 3:1 are generally satisfactory although molar ratios from about 1.5:1 to about 2.5:1 are preferred and best results are obtained when the molar ratio of tertiary phosphine to metal compound catalyst is about 2:1.

The tertiary phosphine is customarily added as a separate material. However, it is also suitable to introduce the phosphine as a portion of a preformed complex with the metal compound catalyst, as in a π-allyl palladium chloride-tertiary phosphine complex, e.g., a π-allyl palladium chloride-triphenylphosphine complex.

The process of the invention is conducted in the presence or in the absence of a solvent. In the modification wherein solvent is employed, solvents that are suitable are those capable of dissolving the ether reactant, catalyst, catalyst promoter and phosphine, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent.

In one modification of the process of the invention, the aromatic octadienyl ether reactant, the metal compound catalyst, the phenoxide anion catalyst promoter and the tertiary phosphine are charged to an autoclave or similar reactor wherein the temperature and pressure of the reaction mixture can be controlled. The efficiency degradation process of the invention, as previously stated, is increased by the removal of at least one degradation product from the reaction mixture, thereby preventing recombination of the phenol and octatriene degradation products thought to be produced by the establishment of one or more equilibria in the reaction system. Although alternate methods of effecting removal of at least one of the degradation products are available, e.g., as by processes of precipitation or through the formation of more stable complexes or derivatives of one of the degradation products, the preferred method of effecting removal of at least one degradation product comprises a controlled removal of the degradation product(s) in the vapor phase, e.g., by a process of distillation under controlled conditions of temperature and pressure. It will be apparent that in this latter process as in any distillation process the pressure and temperature required to effect removal of one product mixture component will be interdependent, and by selecting either a specific pressure or a specific temperature, the other variable will be determined by the physical laws governing the correlation of the vapor pressure of the compound undergoing vapor-phase removal with the temperature at which the material is maintained. It will also be apparent that at any given pressure, the temperature required to effect vapor phase removal of at least one degradation product will depend upon the particular products obtained. In all cases, a $C_8$–$C_{10}$ 1,3,7-octatriene is obtained as one product, and another product will be the phenol corresponding to the aromatic moiety of the aromatic octadienyl ether reactant. Normally, the $C_8$–$C_{10}$ octatriene is the lower-boiling degradation product and the product initially removed in the vapor phase will be the octatriene. Of course, upon the removal of at least one degradation product, the possibility of octatriene and phenol recombination no longer exists, so that the subsequent removal of any single degradation product which remains in product mixture is effected by distillation or other conventional means, e.g., selective extraction or the like. For example, subsequent to 1,3,7-octatriene removal from the product mixture resulting from degradation of 1-phenoxy-2,7-octadiene, the phenol product, if desired, is conveniently removed by distillation at the same conditions or at any other convenient pressure and temperature.

As previously stated, control of the conditions under which at least one of the degradation products is initially removed in the vapor phase from the reaction mixture is required for the success of the process. It is essential that a reduced pressure, i.e., a pressure lower than atmospheric, be employed for the initial removal of degradation product, as distillation at atmospheric pressure does not result in the efficient production of $C_8$–$C_{10}$ octatriene. In general, the yield of the octatriene is inversely dependent upon the pressure at which the initial vapor-phase removal of at least one degradation product takes place. Satisfactory results are generally obtained when pressures below about 50 mm. Hg are employed, although better results are typically obtained when a pressure below about 10 mm. is employed and pressures at or about 1 mm. are particularly suitable. The precise temperature at which initial vapor-phase removal of at least one degradation product takes place will, as previously stated, depend upon the particular degradation products, especially the $C_8$–$C_{10}$ octatriene product. However, the effective temperature is readily determined by controllably raising the temperature of the reaction mixture at the selected reduced pressure until the vapor-phase removal of product takes place. In the case of the degradation of 1-phenoxy-2,7-octadiene, typical temperatures are about 80° C. when pressures on the order to 1 mm. are utilized.

Subsequent to removal of degradation products, the "bottoms" residue, which contains as components the metal compound catalyst, the phenoxide anion catalyst promoter and the tertiary phosphine, or reaction products thereof, is suitably employed for additional reaction as by introducing thereto additional aromatic octadienyl ether.

In the above-described modification of the process of the invention, the aromatic octadienyl ether is employed as a preformed material. The preparation and isolation of such ethers, which are believed to be novel, are fully described and claimed in the co-pending application of E. J. Smutny, U.S. Serial No. 455,965, filed of even date. By the process of this co-pending application, useful aromatic alkadienyl ethers are efficiently prepared, and thereafter are suitable for utilization as reactants in the process of the present invention. In an alternate modification of the present invention, the aromatic $C_8$–$C_{10}$ octadienyl ether is prepared in situ as by the process of the above-copending application and is subsequently degraded to the corresponding 1,3,7-octatriene by the present process without the necessity for separation and/or purification. By the process of the above co-pending application, phenols of varying types are reacted with, inter alia, butadiene or isoprene in the presence of certain metal compound catalysts and phenoxide anion catalyst promoters, the suitable catalyst and phenoxide catalyst promoters being substantially similar to the metal compound catalyst and phenoxide anion catalyst promoter employed in the present process and defined above.

In an in situ production of the aromatic octadienyl ether reactants of the present process, a phenol is reacted in the presence of the above-defined catalyst and catalyst promoter with α,ω-conjugated diene having only hydrogen substituents on the terminal carbon atoms of the four-carbon chain and having from 0 to 1 methyl groups as the only non-hydrogen substituents on the internal, i.e., non-terminal, carbon atoms. The α,ω-conjugated diene reactant therefore comprises butadiene having from 0 to 1 internal-carbon methyl substituents. These compounds are butadiene and isoprene. Although it is within the contemplated scope of the present process to employ a mixture of butadiene and isoprene, thereby obtaining a $C_9$ co-dimer moiety, utilization of a single diene is preferred, especially butadiene. In terms of the reactants of the present invention, phenols suitably employed are represented by the formula

R—OH wherein R has the previously stated significance. Preferred phenol reactants for the "in situ" modification of the process of the present invention are mononuclear, monohydric, (halo)hydrocarbon phenols of up to 14 carbon atoms and up to 3 atoms of halogen, particularly halogen of atomic number from 17 to 35, which have only aromatic unsaturation present in the molecule. The use of phenol is particularly suitable, which will, when reacted with butadiene, result in the formation of 1-phenoxy-2,7-octadiene which is preferred as reactant in the present process. The phenol and conjugated diene are contacted in a molar ratio preferably from about 1:3 to about 1:10, in the presence of from about 0.001% mole to about 1% mole based on total reactants of the metal compound catalyst and from about 1 mole to about 8 moles per mole of catalyst of the phenoxide anion catalyst promoter. Reaction temperatures from about −20° C. to about 150° C. are satisfactory, with temperatures from about −10° C. to about 40° C. being preferred, and reaction pressures typically vary from about 1 atmosphere to about 80 atmospheres. The course of the reaction which forms the aromatic $C_8$–$C_{10}$ octadienyl ether is followed by observing the pressure drop within the reactor, by analysis of samples periodically withdrawn from the reactor, or by other conventional methods. At the conclusion of the ether-forming reaction, the tertiary phosphine required for efficient operation of the degradation process of the present invention is added and degradation is effected by removal of at least one degradation product from the reaction mixture as previously described. For example, at the conclusion of the reaction of the phenol and butadiene, the reaction mixture is cooled if necessary, the pressure within the reactor is reduced, phosphine is added and the resulting mixture is then heated until the removal of at least one degradation product in the vapor phase is effected.

In yet another modification of the process of the invention, $C_8$–$C_{10}$ octatriene production is accomplished by the in situ method above described, except that the tertiary phosphine desirably present during the subsequent degradation process is included within the reaction mixture wherein the aromatic $C_8$–$C_{10}$ octadienyl ether is formed. In general, however, the presence of tertiary phosphine during the process of aromatic octadienyl ether formation is not beneficial and in most instances exhibits an adverse effect. It is therefore preferred, when an in situ production of aromatic octadienyl ether is employed, to prepare the ether reactant of the degradation process in the presence of metal compound catalyst and phenoxide anion catalyst promoter, and introduce the tertiary phosphine at a time subsequent to formation of the aromatic octadienyl ether but prior to the degradation thereof.

Subsequent to either in situ method of aromatic octadienyl ether as above described, the degradation process of the present invention is conducted in the above manner to efficiently produce the desired $C_8$–$C_{10}$ octatriene product of the present process, specifically 1,3,7-octatriene when butadiene is employed as the $\alpha,\omega$-conjugated diene or dimethyl-1,3,7-octatriene, i.e., 3,6-dimethyl-1,3,7-octatriene and/or 3,7-dimethyl-1,3,7-octatriene, when isoprene is utilized.

The octatriene product, in part because of the number and arrangement of the ethylenically unsaturated moieties present, is useful in a number of applications. It is apparent that the product of the invention in one respect is an $\alpha,\omega$-diene, one moiety of which is a portion of a conjugated diene system. The octatriene product is suitably employed as a monomer in polymerization processes or is employed in co-polymerization with other monomers. The octatriene is employed as the diene or as the dienophile in Diels-Alder condensations, and is epoxidized to form epoxide products from which are formed useful epoxy resins through reaction with a variety of conventional curing agents. The ethylenic linkage(s) are hydrated or hydroxylated to form alcohols from which ethers, carboxylate esters, sulfates, sulfonates or the like are produced, or are halogenated to form halo derivatives useful, for example, as precursors for quaternary ammonium salts. Additionally, the octatriene is partially hydrogenated to form other olefinic products.

To further illustrate the improved process of the present invention, the following examples are provided. It should be understood that the details thereof are not to be regarded as limitations, as they may be varied as will be understood by one skilled in this art.

*Example I*

To a reactor was charged 0.05 mole of 1-phenoxy-2,7-octadiene, 0.29 g. of $\pi$-allyl palladium chloride-triphenylphosphine complex, $C_3H_5PdCl \cdot (C_6H_5)_3P$, and 0.076 g. of sodium phenoxide. The reactor was placed in a bath which was gradually heated after the reaction pressure had been reduced to about 1 mm. At this pressure, the phenol and octatriene degradation products were removed at a bath temperature of about 90° C., the probable temperature of the reaction mixture being about 80° C. The distillate was collected in a series of cold traps and analyzed by gas-liquid chromatographic methods. The conversion of the 1-phenoxy-2,7-octadiene was found to be 81% and the selectivity to 1,3,7-octatriene, B.P. 122° C. at 760 mm., based on the 1-phenoxy-2,7-octadiene was 80%. The infrared, ultraviolet and nuclear magnetic resonance spectra of 1,3,7-octatriene were typical for such a compound.

When a similar experiment was conducted employing 0.025 mole of 1-phenoxy-2,7-octadiene and 0.146 g. of the $\pi$-allyl palladium chloride-triphenylphosphine complex but without the addition of the sodium phenoxide, no reaction took place and only 1-phenoxy-2,7-octadiene was recovered.

*Example II*

To a reactor was charged 0.05 mole of 1-phenoxy-2,7-octadiene, 0.458 g. of bis(benzonitrile)palladium chloride, 0.263 g. of sodium phenoxide and 0.625 g. of triphenylphosphine. The mixture was distilled and analyzed as in Example I. The conversion of 1-phenoxy-2,7-octadiene was 99% and the selectivity to 1,3,7-octatriene based on 1-phenoxy-2,7-octadiene charged was 96%.

*Example III*

To a reactor was charged 0.106 mole of phenol, 0.415 mole of butadiene, 0.25 g. of palladium chloride and 0.325 g. of sodium phenate. The mixture was maintained at −3° C. to 7° C. for 40 hours at which time more than 98% of the phenol had reacted as shown by gas-liquid chromatographic analysis. To the mixture was added 0.75 g. of triphenylphosphine and the resulting mixture was distilled at a reduced pressure of 1 mm. and at a bath temperature of about 90° C. Analysis of the distillate indicated that the yield of 1,3,5-octatriene was 76% based on phenol charged.

A good yield of 1,3,7-octatriene is also obtained when ruthenium bromide is used in place of the palladium chloride of the above example.

*Example IV*

The procedure of Example III was repeated employing 0.375 g. of $\pi$-allyl palladium chloride in place of the palladium chloride of that example. The conversion of phenol was greater than 98% at the end of 9 hours. To the mixture was added 1.1 g. of triphenylphosphine and the resulting mixture was distilled as in Example I. Gas-liquid chromatographic analysis of the distillate indicated that the yield of 1,3,7-octatriene was 85% based on phenol charged.

The above experiment was repeated, except that 0.75 g. of 1,2-bis(diphenylphosphino)ethane was added prior to distillation rather than the triphenylphosphine. The yield of 1,3,7-octatriene was 71%.

*Example V*

To a reactor was charged 0.106 mole of phenol, 0.415 mole of butadiene, 0.375 g. of $\pi$-allyl palladium chloride and 0.325 g. of sodium phenate. The mixture was maintained at a temperature of from −3° C. to 7° C. and the conversion of phenol, determined by gas-liquid chromatographic analysis, was greater than 98% in less than 9 hours. Triphenylphosphine was added to give a molar phosphine:palladium ratio of 2, and the mixture was distilled at reduced pressure as in Example I. The yield of degradation products was 84%, based on the phenol charged, and the selectivity to 1,3,7-octatriene was 98% based on the degradation products formed.

To the cooled "bottoms" of this distillation was added 0.1 mole of 1-phenoxy-2,7-octadiene and the resulting mixture was distilled in the same manner. Gas-liquid chromatographic analysis of the distillate indicated a 94% conversion of the 1-phenoxy-octadiene charged, and a selectivity to 1,3,7-octatriene based on degradation products of 98%.

To the cooled "bottoms" of this distillation was added an additional 0.1 mole of 1 phenoxy-2,7-octadiene and the resulting mixture was distilled and analyzed as before. The conversion of the 1-phenoxy-2,7-octadiene charged was 92% and the selectivity to 1,3,7-octatriene based on degradation products was 98%.

*Example VI*

To a suitable reactor was charged 0.115 mole of phenol, 0.48 mole of butadiene, 1.05 g. of bis(benzonitrile)-palladium chloride and 0.6 g. of sodium phenate. The mixture was maintained at 25° C. for 40 hours, at which time 56% of the phenol had been converted. To the mixture was added 1.1 g. of triphenylphosphine and the resulting mixture was distilled at a reduced pressure of 1 mm., the bath temperature being about 90° C. Gas-liquid chromatographic analysis of the distillate indicated a yield of 1,3,5-octatriene of 62% based on phenol converted in the first portion of the experiment.

*Example VII*

To a rector was charged 0.106 mole of phenol, 0.415 mole of butadiene, 0.375 g. of $\pi$-allyl palladium chloride-pyridine complex, $C_3H_5PdCl \cdot C_5H_5N$, and 0.325 g. of sodium phenoxide. The mixture was maintained at 0° C. for 40 hours, at the end of which the phenol conversion was greater than 98%. To the mixture was added 1.1 g of triphenylphosphine and the resulting mixture was distilled and analyzed as in Example I. The yield of 1,3,7-octatriene was 42% based on the phenol converted.

*Example VIII*

To a reactor was charged 0.1 mole of phenol, 0.417 mole of butadiene, 0.375 g. of platinum chloride and 0.4 g. of sodium phenate. The mixture was maintained at a temperature of from —3° C. to 11° C. for 143 hours, at which time gas-liquid chromatographic analysis of a sample withdrawn from the reactor indicated that a 98% conversion of the phenol had been obtained. To the mixture was then added 1.1 g. of triphenylphosphine and the mixture was distilled at approximately 1 mm. pressure. Analysis of the distillate indicated a 78% conversion of the 1-phenoxy-2,7-octadiene intermediate and the selectivity to 1,3,7-octatriene based on total degradation products was 98%.

*Example IX*

By a procedure similar to that of Example II, 0.024 mole of 1-(p-chlorophenoxy)-2,7-octadiene, 0.15 g. of $\pi$-allyl palladium chloride-triphenylphosphine complex and 0.07 g. of sodium phenate were mixed and distilled at approximately 1 mm. pressure and a pot temperature of approximately 100° C. Gas-liquid chromatographic analysis of the distillate indicated an 84% conversion of the octadienyl ether and a 98% selectivity to 1,3,7-octatriene based on ether converted.

The above procedure was repeated, except that 0.0266 mole of 1-(p-methylphenoxy)-2,7 - octadiene was employed as the ether reactant. The ether conversion was 78% and the selectivity to 1,3,7-octatriene based on degradation products was 98%.

*Example X*

To a reactor was charged 0.425 mole of phenol, 1.66 mole of isoprene, 1.5 g. of $\pi$-allyl palladium chloride and 2.0 g. of sodium phenate. The mixture was maintained for 20 hours at a temperature from —3° C. to 23° C., at which time gas-liquid chromatographic analysis of the reaction mixture showed a 70% conversion of the phenol to 1-phenoxy-dimethyl-2,7-octadienes. To 0.027 mole of the phenoxy-dimethyloctadiene thus prepared was added 0.2 g. of $\pi$-allyl palladium cholride-triphenylphosphine complex and 0.1 g. of sodium phenate, and the resulting mixture was distilled at a pressure of 1 mm. and a pot temperature of approximately 80° C. Analysis of the distillate indicated an 88% conversion to phenol and dimethyl-1,3,7-octatriene, and an 87% selectivity to the dimethyloctatriene based on total degradation products. The dimethyloctatriene product comprises a mixture of isomers, the principal components of which are 3,6-dimethyl-1,3,7-octatriene and 3,7-dimethyl-1,3,7-octatriene.

*Example XI*

To a reactor was charged 0.05 mole of 1-phenoxy-2,7-octadiene, 0.22 g. of $\pi$-allyl palladium chloride, 0.3 g. of sodium phenate and 0.528 g. of tributylphosphine. The resulting mixture was distilled at a pressure of 1 mm. and a pot temperature of approximately 100° C. Gas-liquid chromatographic analysis of the distillate indicated an 84% conversion of the phenoxyoctadiene to phenol and 1,3,7-octatriene and a 98% selectivity to the octatriene based on ether degraded.

I claim as my invention:
1. The process of producing a $C_8$-$C_{10}$-1,3,7-octatriene which comprises
    (A) contacting
        (a) an aromatic $C_8$-$C_{10}$-2,7-octadienyl ether,
        (b) metal compound catalyst wherein the metal is selected from the group consisting of palladium, platinum and ruthenium,
        (c) a phenoxide anion catalyst promoter, and
        (d) a tertiary phosphine, and
    (B) removing from the resulting mixture at least one degradation product thereof, said degradation products comprising a $C_8$-$C_{10}$-1,3,7-octatriene and a phenol.
2. The process of producing a $C_8$-$C_{10}$-1,3,7-octatriene which comprises
    (A) contacting
        (a) an aromatic $C_8$-$C_{10}$-2,7-octadienyl ether, the aromatic moiety of which is aromatic of up to 24 carbon atoms, of 1 to 3 aromatic rings and up to three $C_8$-$C_{10}$-1-(2,7-octadienyloxy) substituents on each ring,
        (b) metal compound catalyst wherein the metal is selected from the group consisting of palladium, platinum and rhuthenium,
        (c) phenoxide anion catalyst promoter, said phenoxide anion corresponding to the anion produced by removal of the hydrogen of at least one hydroxyl group of a phenol of up to 20 carbon atoms and 1 to 4 hydroxyl groups, and
        (d) tertiary phosphine free from aliphatic unsaturation of up to 52 carbon atoms, and
    (B) removing from the resulting mixture at least one degradation product thereof, said degradation products comprising a $C_8$-$C_{10}$-1,3,7-octatriene and a phenol.
3. The process of producing a $C_8$-$C_{10}$-1,3,7-octatriene which comprises
    (A) contacting
        (a) an aromatic $C_8$-$C_{10}$-2,7-octadienyl ether wherein the aromatic moiety is mononuclear, monovalent, (halo)hydrocarbon aromatic of up 14 carbon atoms and up to 3 halogen atoms having only aromatic unsaturation,
        (b) metal compound catalyst wherein the metal is

Group VIII C metal of atomic number from 46 to 78 inclusive, (c) mononuclear, monovalent, (halo)hydrocarbon phenoxide anion catalyst promoter of up to 14 carbon atoms and up to 3 halogen atoms having only aromatic unsaturation, and (d) tertiary aromatic phosphine wherein each phosphorus substituent is mononuclear, monovalent, (halo)hydrocarbon aromatic of up to 14 carbon atoms and up to 3 halogen atoms having only aromatic unsaturation, and (B) removing from the resulting mixture in the vapor phase at a pressure below about 50 mm. at least one degradation product thereof, said products comprising a $C_8$-$C_{10}$-1,3,7-octatriene and a phenol.

4. The process of claim 3 wherein the Group VIII C metal is palladium.

5. The process of claim 3 wherein the Group VIII C metal is platinum.

6. The process of producing a $C_8$-$C_{10}$-1,3,7-octatriene which comprises (A) contacting (a) an aromatic $C_8$-$C_{10}$-2,7-octadienyl ether wherein the aromatic moiety is mononuclear, monovalent, (halo)hydrocarbon aromatic of up to 14 carbon atoms and up to 3 halogen atoms having only aromatic unsaturation, (b) metal compound catalyst wherein the metal is Group VIII C metal of atomic number from 46 78 inclusive, (c) monuclear, monovalent, (halo)hydrocarbon phenoxide anion catalyst promoter of up to 14 carbon atoms and up to 3 halogen atoms having only aromatic unsaturation, and (d) tertiary aromatic diphosphine wherein each phosphorus atom has two mononuclear, monovalent, (halo)hydrocarbon aromatic substituents of up to 14 carbon atoms and up to 3 halogen atoms and having only aromatic unsaturation, and the phosphorus-connecting moiety is divalent saturated aliphatic of from 2 to 3 carbon atoms, and (B) removing from the resulting mixture in the vapor phase at a pressure below about 50 mm. at least one degradation product thereof, said products comprising a $C_8$-$C_{10}$-1,3,7-octatriene and a phenol.

7. The process of producing a $C_8$-$C_{10}$-1,3,7-octatriene which comprises (A) contacting (a) an aromatic $C_8$-$C_{10}$-2,7-octadienyl ether wherein the aromatic moiety is mononuclear, monovalent, (halo)hydrocarbon aromatic of up to 14 carbon atoms and up to 3 halogen atoms having only aromatic unsaturation, (b) metal compound catalyst wherein the metal is Group VIII C metal of atomic number from 46 to 78 inclusive, (c) mononuclear, monovalent, (halo)hydrocarbon phenoxide anion catalyst promoter of up to 14 carbon atoms and up to 3 halogen atoms having only aromatic unsaturation, and (d) trialkylphosphine wherein each alkyl independently is alkyl of up to 14 carbon atoms, and (B) removing from the resulting mixture in the vapor phase at a pressure below about 50 mm. at least one degradation product thereof, said degradation products comprising a $C_8$-$C_{10}$-1,3,7-octatriene and a phenol.

8. The process of claim 7 wherein the trialkyl phosphine is tributylphosphine.

9. The process of producing 1,3,7-octatriene which comprises (A) contacting (a) an aromatic 2,7-octadienyl ether wherein the aromatic moiety is mononuclear, monovalent, hydrocarbon aromatic of up to 14 carbon atoms having only aromatic unsaturation, (b) a palladium chloride catalyst, (c) mononuclear, monovalent, hydrocarbon phenoxide anion catalyst promoter of up to 14 carbon atoms having only aromatic unsaturation, the molar ratio of phenoxide anion to said palladium chloride being from about 1:1 to about 8:1, (d) triphenylphosphine, the molar ratio of triphenylphosphine to said palladium chloride being from about 1:1 to about 3:1, and (B) removing from the resulting mixture in the vapor phase at a pressure below about 10 mm. at least one degradation product thereof, said products comprising 1,3,7-octatriene and a phenol.

10. The process of claim 9 wherein the palladium chloride catalyst is a $\pi$-allyl palladium chloride.

11. The process of producing dimethyl-1,3,7-octatriene which comprises (A) contacting (a) an aromatic dimethyl-1,7-octadienyl ether wherein said methyl substituents are located on the carbon atom of the octadienyl moiety numbered 3 and one of the carbon atoms of the octadienyl moiety numbered 6 and 7, and wherein the aromatic moiety is mononuclear, monovalent, hydrocarbon aromatic of up to 14 carbon atoms having only aromatic unsaturation, (b) metal compound catalyst wherein the metal is Group VIII C metal of atomic number from 46 to 78 inclusive, (c) mononuclear, monovalent, hydrocarbon phenoxide anion catalyst promoter of up to 14 carbon atoms and up to 3 halogen atoms having only aromatic unsaturation, and (d) trialkylphosphine wherein each alkyl independently is alkyl of up to 14 carbon atoms, and (B) removing from the resulting mixture in the vapor phase at a pressure below about 100 mm. at least one degradation product thereof, said products comprising dimethyl-1,3,7-octatriene and a phenol.

12. The process of claim 11 wherein the metal compound is a $\pi$-allyl palladium chloride.

13. The process of producing 1,3,7-octatriene which comprises (A) contacting (a) 1-phenoxy-2,7-octadiene (b) a Group VIII C metal chloride catalyst wherein the metal is Group VIII C metal of atomic number from 46 to 78 inclusive, (c) from about 1 mole to about 8 moles per mole of Group VIII C metal chloride of phenate anion, and (d) from about 1 mole to about 3 moles per mole of Group VIII C metal chloride of triphenylphosphine, and (B) removing from the resulting mixture in the vapor phase at a pressure of about 1 mm. at least one degradation product thereof, said products comprising 1,3,7-octatriene and phenol.

14. The process of claim 13 wherein the Group VIII C metal chloride is platinum chloride.

15. The process of producing 1,3,7-octatriene which comprises (A) contacting (a) 1-phenoxy-2,7-octadiene (b) from about 0.001% mole to about 1% mole based on 1-phenoxy-2,7-octadiene of $\pi$-allyl palladium chloride, (c) from about 1 mole to about 8 moles per mole of $\pi$-allyl palladium chloride of phenate anion, and (B) removing from the resulting mixture in the vapor phase at a pressure of about 1 mm. at least one degradation product thereof, said products comprising 1,3,7-octatriene and phenol.

16. The process of producing a $C_8$-$C_{10}$-1,3,7-octatriene which comprises
 (A) contacting mononuclear, monohydric, (halo)hydrocarbon phenol of up to 14 carbon atoms and up to 3 halogen atoms having only aromatic unsaturation, with from about 3 moles to about 10 moles per mole of said phenol of a butadiene having from 0 to 1 internal-carbon methyl substituents, in the presence of from about 0.001% mole to about 1% mole based on total reactants of metal compound catalyst, wherein the metal is selected from the group consisting of palladium, platinum and ruthenium, and from about 1 mole to about 8 moles per mole of said metal compound of mononuclear, monovalent, (halo)hydrocarbon phenoxide anion catalyst promoter of up to 14 carbon atoms and up to 3 halogen atoms having only aromatic unsaturation, at a temperature of from about —10° C. to about 40° C. and a pressure of from about 1 atmosphere to about 80 atmospheres,
 (B) adding thereto from about 1 mole to about 3 moles per mole of said metal compound of tertiary aromatic phosphine, each phosphorus substituent being mononuclear, monovalent, (halo)hydrocarbon aromatic of up to 14 carbon atoms and up to 3 halogen atoms having only aromatic unsaturation, and
 (C) removing from the resulting mixture in the vapor phase at a pressure below about 50 mm. at least one degradation product thereof, said degradation products comprising a $C_8$-$C_{10}$-1,3,7-octatriene and said phenol.

17. The process of producing 1,3,7-octatriene which comprises
 (A) contacting phenol with from about 3 moles to about 10 moles per mole of phenol of butadiene, in the presence of from about 0.001% mole to about 1% mole based on total reactants of $\pi$-allyl palladium chloride, and from about 1 mole to about 8 moles per mole of $\pi$-allyl palladium chloride of phenate anion at a temperature of from about —10° C. to about 40° C. and a pressure of from about 1 atmosphere to about 80 atmospheres,
 (B) adding thereto from about 1 mole to about 3 moles per mole of $\pi$-allyl palladium chloride of triphenylphosphine, and
 (C) removing from the resulting mixture in the vapor phase at a pressure below about 10 mm. at least one degradation product thereof, said degradation products comprising 1,3,7-octatriene and phenol.

18. The process of claim 17 wherein the pressure at which at least one degradation product is removed is about 1 mm.

19. The process of producing dimethyl-1,3,7-octatriene which comprises
 (A) contacting phenol with from about 3 moles to about 10 moles per mole of phenol of isoprene, in the presence of from about 0.001% mole to about 1% mole based on total reactants of $\pi$-allyl palladium chloride, and from about 1 mole to about 8 moles per mole of $\pi$-allyl palladium chloride of phenate anion at a temperature of from about —10° C. to about 40° C. and a pressure of from about 1 atmosphere to about 80 atmospheres,
 (B) adding thereto from about 1 mole to about 3 moles per mole of $\pi$-allyl palladium chloride of triphenylphosphine, and
 (C) removing from the resulting mixture in the vapor phase at a pressure below about 10 mm. at least one degradation product thereof, said degradation products comprising dimethyl-1,3,7-octatriene and phenol.

20. The process of claim 17 wherein the pressure at which at least one degradation product is removed is about 1 mm.

No references cited.

DELBERT E. GANTZ, *Primary Examiner.*

G. E. SCHMITKONS, *Assistant Examiner.*